United States Patent
Yamane et al.

(10) Patent No.: US 7,322,738 B2
(45) Date of Patent: Jan. 29, 2008

(54) CONICAL TWIN-SCREW EXTRUDER AND DEHYDRATOR

(75) Inventors: Yasuaki Yamane, Takasago (JP); Koichi Miyake, Takasago (JP); Hideo Funahashi, Takasago (JP); Masao Murakami, Takasago (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 258 days.

(21) Appl. No.: 11/075,710

(22) Filed: Mar. 10, 2005

(65) Prior Publication Data

US 2005/0219943 A1 Oct. 6, 2005

(30) Foreign Application Priority Data

Mar. 30, 2004 (JP) ............................. 2004-100970

(51) Int. Cl.
*B29B 7/48* (2006.01)
*B29B 7/74* (2006.01)

(52) U.S. Cl. ............................. 366/75; 366/77; 366/83; 366/91

(58) Field of Classification Search ............ 366/69–91; 425/200–209; 210/609; 100/116, 145–146; 426/512–517; 198/661, 671
See application file for complete search history.

(56) References Cited

U.S. PATENT DOCUMENTS 2,041,619 A * 5/1936 Steele ......................... 366/75
4,764,020 A * 8/1988 Moriyama ................. 366/76.4
5,232,280 A 8/1993 Moriyama
5,310,256 A * 5/1994 Boden .......................... 366/77
5,851,065 A * 12/1998 Ikeda et al. .................... 366/85
6,609,819 B2 * 8/2003 Hauck et al. .................. 366/85
6,638,051 B2 * 10/2003 Yamaguchi et al. ......... 425/204
2005/0219943 A1* 10/2005 Yamane et al. ............... 366/77

FOREIGN PATENT DOCUMENTS

| DE | 3920422 A1 * | 1/1991 |
| EP | 0041641 A2 * | 12/1981 |
| JP | 58-36425 * | 3/1983 |
| JP | 2001-353719 | 12/2001 |
| JP | 2002-355879 * | 12/2002 |

* cited by examiner

*Primary Examiner*—Charles E. Cooley
(74) *Attorney, Agent, or Firm*—Oblon, Spivak, McClelland, Maier & Neustadt, P.C.

(57) ABSTRACT

In a conical twin-screw extruder in which two rotor shafts having flights on the outer peripheral surfaces thereof and being adjacent to each other in the lateral direction are accommodated in a barrel having a raw material supply port on one side and a raw material discharge port on the other side, and the distance between the rotor shafts and the outside diameters of the flights thereof are gradually reduced from the supply port side to the discharge port side, characteristically, the barrel is provided with a water-removing port for removing water contained in a raw material supplied through the raw material supply port, out of the barrel. The extruder can be applied to raw materials various shapes, sizes, and properties.

19 Claims, 3 Drawing Sheets

CONICAL TWIN-SCREW EXTRUDER AND DEHYDRATOR

BACKGROUND OF THE INVENTION

1. Field of the Invention

The present invention relates to a conical twin-screw extruder and a dehydrator for use in dehydration of water-containing raw materials such as thermoplastic elastomers, rubbers, resins, and the like which contain water, respectively.

2. Description of the Related Art

There is known a dehydrator described in Japanese Unexamined patent application publication No. 2001-353719 as a dehydrator useful for water-containing raw materials. In FIG. 2 of this Patent Document, a technique is disclosed by which a conical single-screw extruder is used as a dehydrator, and a parallel twin-screw extruder is arranged in tandem to be used as a dehydrator.

Referring to the above-described known dehydrator, a water-containing raw material to be supplied should have specifications corresponding to a machine. Thus, there has been a problem in that the dehydrator can not be applied to various types of raw materials.

In particular, in some cases, the hydrator can not constantly nip all of the materials ranging from a powdery raw material to a raw material in a large block shape having a diameter of more than 200 mm. Therefore, problems occur in that variations in processing amount are caused when the dehydrator is used. Moreover, there are some cases in which no production can be performed with raw materials supplied, depending on the shapes and sizes thereof.

Moreover, dehydrators of known types can be applied to raw materials having a water content of about 10% to 40%. Problematically, the dehydrators can not process raw materials having a water content of about 80%, raw materials containing a large amount of water, e.g., those which are conveyed together with water, and so forth.

SUMMARY OF THE INVENTION

Accordingly, an object of the present invention is to provide a dehydrator which can be applied to raw material having various shapes, sizes and properties.

To achieve the above-described object, the following means are provided according to the present invention. That is, in a conical twin-screw extruder in which two rotor shafts having flights on the outer peripheral surfaces thereof and being adjacent to each other in the lateral direction are accommodated in a barrel having a raw material supply port on one side and a raw material discharge port on the other aide, and the distance between the shafts of the rotor shafts and the outside diameters of the flights thereof are gradually reduced from the supply port side to the discharge port side, characteristically, the barrel is provided with a water-removing port for removing water contained in a raw material supplied through the raw material supply port out of the barrel.

A conical twin-screw extruder can be applied to raw materials with various shapes and sizes, since the nipping performance for a raw material supplied through a raw material supply port is superior, compared to that of a conical single-screw extruder or a parallel twin-screw extruder. The conical twin-screw extruder can compress a water-containing raw material at a high ratio. Thus, the dehydrating effect is high. Accordingly, the conical twin-screw extruder can be used as a dehydrator for a water-containing raw material by providing a water-removing port for the barrel.

Preferably, the axial lines of the two rotor shafts form an angle of 10 to 40 degrees.

If the angle defined by the rotor shafts is less than 10 degrees, the lengths of the rotor shafts must be increased to ensure the compression ratio. Thus, it becomes meaningless to change the distance between the shafts. If the angle exceeds 40 degrees, the lengths of the rotor shafts will be small. Thus, the lengths sufficient for dehydration of the rotor shafts can not be ensured. Moreover, it is unprofitable that the diameter of the shaft having a relatively large diameter will be excessively large.

Preferably, the flights of one of the rotor shafts and the flights of the other of the rotor shafts are in the meshed state, and the two rotor shafts can be rotated in different directions.

With the constitution employed as described above, the nipping performance for raw materials having various shapes is enhanced. Thus, raw materials having various shapes, that is, having a powdery shape, a crumb shape, or a veil shape, can be efficiently conveyed and compressed.

Preferably, the barrel has a chamber peripheral wall surrounding the flights, the chamber peripheral wall is formed in such a manner that the cross-section has substantially a shape consisting of two circles which have the same diameter and overlap with each other, the size of the cross-section is gradually decreased from the raw material supply port to the raw material discharge port, and the chamber peripheral wall is provided with the water-removing port.

With the constitution employed as described above, a raw material can be highly compressed without the conveying capacity being deteriorated. Therefore, the dehydration effect and the processing capability can be enhanced.

The raw material supply port may be opened on the upper side, the discharge port may be opened in the axial direction of the rotor shafts, and the water-removing port may be opened in the radial direction of the rotor shafts.

Preferably, a screen is provided for the water-removing port.

Fine particles, which are contained in a raw material, or are generated in a process, are suppressed from leaking through the water-removing port, since the screen is provided for the water-removing port. Thus, water only can be separated and removed.

Preferably, the screen is a wedge wire screen having a predetermined clearance, or a punching plate.

Preferably, each of the flights is formed in such a manner that the maximum diameter is 1.5 to 5.0 times of the minimum diameter.

A sufficient compression force can be ensured by setting the maximum diameter of the flight of the rotor shaft at least 1.5 times of the minimum diameter. Moreover, the raw material supply port of the barrel can be easily increased. If the maximum diameter is set more than 5 times of the minimum diameter, unsuitably, the angle defined by the rotor shafts becomes at least 40 degrees.

Preferably, one of the rotor shafts is extended from the other rotor shaft in the axial direction on the discharge port side, and the extended portion functions as a single-shaft metering portion from which a raw material is extruded out at a constant rate.

With the constitution employed as described above, variations in conveying amount per unit time are reduced. Thus, a raw material can be supplied at a constant amount-rate to the succeeding process.

Preferably, a gear pump is connected on the raw material discharge port.

The inner pressure of the barrel can be enhanced with the gear pump. Thus, the dehydrating efficiency can be enhanced. Moreover, the accuracy of the supply to the succeeding process can be enhanced by metering the raw material with the gear pump, even if no metering portion is provided. In the case in which the metering portion is provided, the accuracy of the supply to the succeeding process can be still more enhanced.

Preferably, a throttling portion is connected to the raw material discharge port instead of the gear pump. The dehydrating efficiency can be enhanced by the back pressure, which is caused by the resistance at the discharge port given by the throttling portion.

Both of the gear pump and the throttling portion may be provided.

Also, there may be provided a dehydrating apparatus comprising a parallel twin-screw extruder connected to the above-described conical twin-screw extruder and positioned downstream of the conical twin-screw extruder, the parallel twin-shaft extruder containing a heater for heating the extruder barrel, a dehydrating screen and/or a vent for removing steam provided for the extruder barrel.

Preferably, a pressure-reducing and deaerating device is connected to the vent.

According to the above-described dehydrating apparatus, a raw material with a high water content can be continuously dehydrated and/or dried to be formed into pellets.

According to the present invention, raw materials various shapes, sizes and properties can be processed with the same apparatus.

BRIEF DESCRIPTIONS OF THE DRAWINGS

FIG. 1 is a plan view showing an embodiment of a conical twin-screw extruder of the present invention with barrel 2 and barrel 16 of the extruder shown in cross-sectional view alone line I-I in FIG. 2.

FIG. 2 is a side view of the conical twin-screw extruder of FIG. 1 with barrel 2 and barrel 16 of the extruder shown in cross-sectional view alone line II-II in FIG. 1, and with driving device 7, motor 8, and bevel gear 9 removed for simplicity.

DESCRIPTION OF THE PREFERRED EMBODIMENTS

Embodiments of the present invention will be further described with reference to the drawings.

Figure 1:
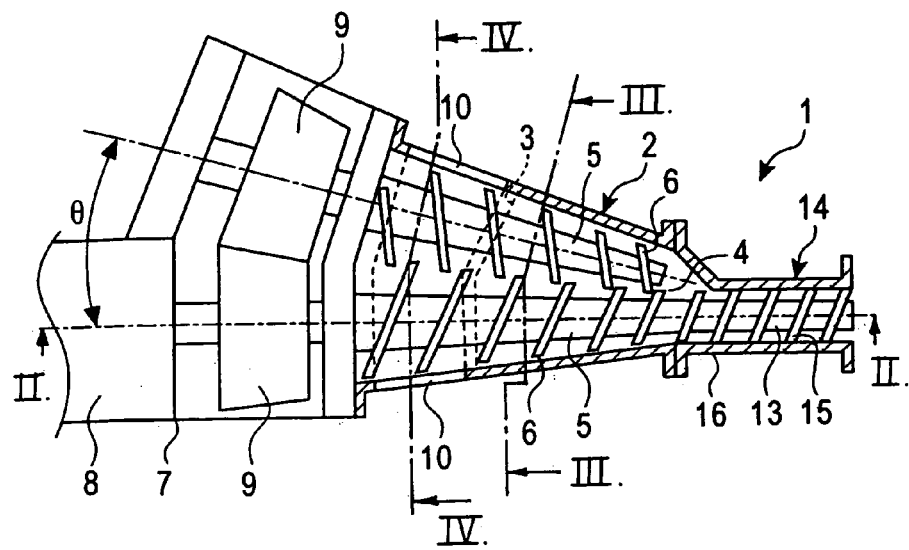
Figure 2:
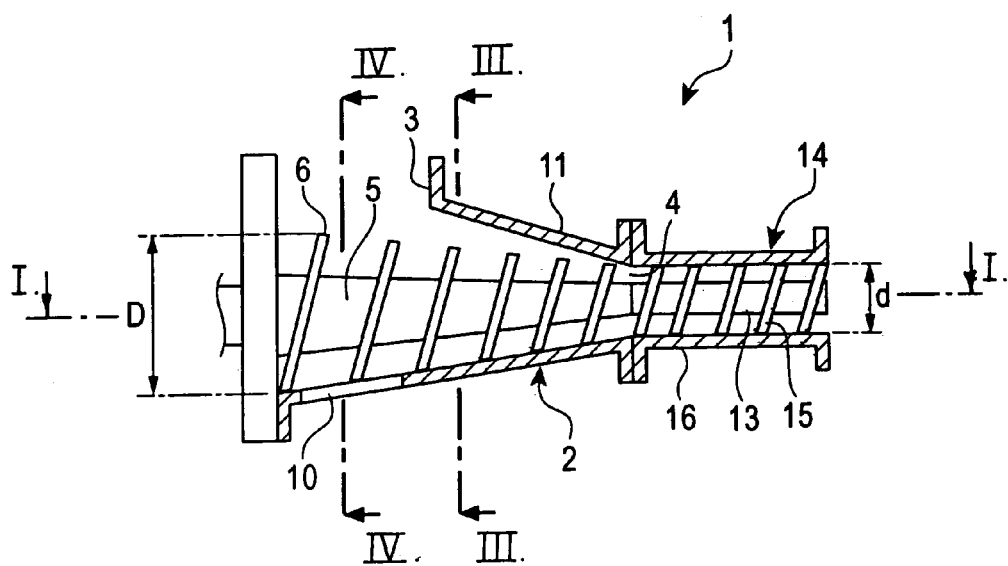

Referring to FIGS. 1 and 2, FIG. 1 is a plan view of a conical twin-screw extruder 1 for compressing and dehydrating thermoplastic elastomers, rubbers, resins, or the like each containing water. FIG. 2 is a side view of the conical twin-screw extruder 1.

The conical twin-screw extruder 1 contains an extruder-body barrel 2. A raw material supply port 3 for supplying a water-containing raw material is provided on one side of the barrel 2. A raw material discharge port 4 for discharging the raw material from which water has been removed is provided on the other side of the barrel 2.

The two rotor shafts 5 are arranged in such a manner that the distance between the rotor shafts 5 is gradually decreased from the supply port 5 side to the discharge port 4 side. A flight 6 is formed on the outer periphery of each of the rotor shafts 5. The flight 6 is formed in a spiral vane shape. The rotor shaft 5 and the flight 6 are formed in such a manner that the outside diameters thereof gradually decrease from the supply port 3 side to the discharge port 4 side.

The two rotor shafts 5 are arranged in such a manner that the distance between the rotor shafts 5 is gradually decreased from the supply port 5 side to the discharge port 4 side. A flight 6 is formed on the outer periphery of each of the rotor shafts 5. The fight 6 is formed in a spiral vane shape. The rotor shaft 5 and the flight 6 are formed in such a manner that the outside diameters thereof gradually decrease from the supply port 3 side to the discharge port 4 side.

The rotor shafts 5 are arranged so that the angle θ formed by the axial lines is in the range from 10 to 40 degrees. The two rotor shafts 5 are arranged in such a manner that the flights 6 thereof are in the meshed state. The reason for the above-described setting of the angle θ is as follows. That is, if the angle θ is excessively large, i.e., more than 40 degrees, the nipping performance will be inferior in the area of the compression zone to the metering zone. Moreover, a high load is applied in the compression zone, so that mechanical problems occur. If the angle θ is set smaller than 10 degrees, nipping performance will be inferior unless the diameters of the flights 6 are set large. However, in the case in which the diameters of the flights 6 are increased, the mechanical lengths become longer. Therefore, the above-described angle range is preferable.

The flights 6 positioned under the supply port 3 have such a shape that the flights 6 can nip raw materials which range from a powder having a size of about 10 μm to large blocks having a diameter of about 200 mm.

Each flight 6 is formed in such a manner that the maximum diameter D thereof is 1.5 to 5 times of the minimum diameter d thereof. When the maximum diameter D is 5.0 times of the minimum diameter d, the flight 6 can nip a raw material having a size of about 5 times of the minimum diameter d of the flight 6. Moreover, the flights 6 positioned under the supply port 3 and having the above-described sizes can directly supply a raw material containing a large amount of water, i.e., having a water content of 10 to 90%. Moreover, when a raw material having a high water content is supplied, the discharge amount can be also increased.

The diameter ratios D/d of the flights 6 have a relationship to the above-described angle θ. The volume of the supply port 3 can be sufficiently increased with respect to the discharge port 4, by setting the ratio D/d in a range of 1.5 to 5.0. From the viewpoint of compression and dehydration, it is desirable to set the maximum diameter D large value with respect to the minimum diameter d. However, if the maximum diameter D is set large, the angle θ between the shafts become wide. Thus, the nipping in a raw material becomes deficient in the metering zone. Mechanical problems occur, due to the increased load in the compression zone.

The two rotor shafts 5 on the larger diameter sides are cantilevered on the end walls of the barrel 2. A driving device 7 is provided in this supporting portion.

The driving device 7 causes the two rotor shafts 5 to rotate in the different directions. The rotational directions of the rotor shafts 5 are such that a raw material supplied through the supply port 3 is nipped between the two rotor shafts 5.

According to this embodiment, one of the rotor shafts 5 is driven by a motor 8, and the other rotor shaft 5, linked with and connected to a bevel gear 9, is rotated in the different direction. However, the driving system is not restricted to the above-descried one.

A water-removing port 10 is provided for the barrel 2. Water contained in a raw material supplied through the raw material supply port 3 is discharged through the water-removing port 10 until the raw material is discharged from the discharge port 4. The water-removing port 10 is opened in the radial direction of the rotor shafts 5.

The water-removing port 10 is provided downward of the raw material supply-port 3.

Figure 3:
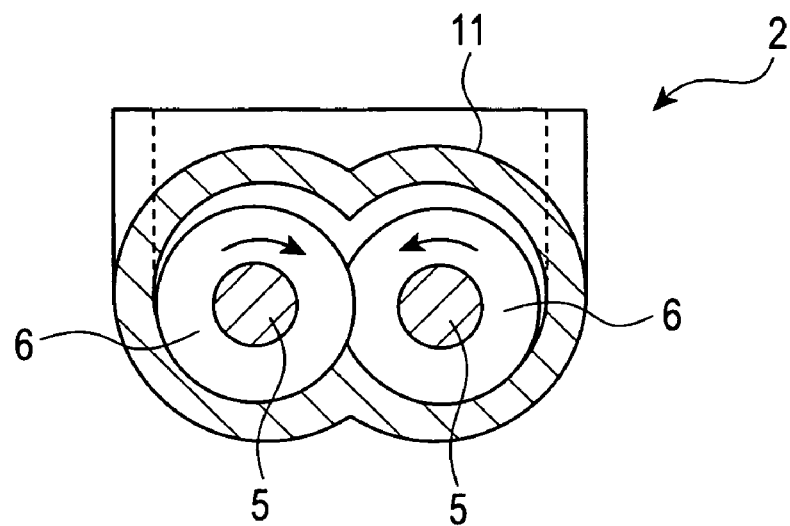
FIG. 3 is a cross-sectional view taken along lines III-III in FIGS. 1 and 2.

As shown in FIGS. 2 and 3, the barrel 2 contains a chamber peripheral wall 11 surrounding the flights 6. The chamber peripheral wall 11 is formed in such a manner that the cross-section has substantially a spectacle-hole-shape (a shape consisting of two circles having the same diameter and overlapping with each other). The size of the cross-section is gradually decreased from the raw material supply port 3 to the discharge port 4. A gap is formed between the chamber peripheral wall 11 and the upper side of the flights 6. The gap is decreased toward the top-end side. The gap facilitates the nipping in a raw material. Moreover, a mechanical load, caused by the difference between the conveyed amounts of a raw material in the large diameter portions of the flights 6 and in the small diameter portions thereof, can be allowed for, due to the back-flow of the raw material.

The water-removing port 10 is formed in the chamber peripheral wall 11. The water-removing port 10 is formed ranging from the side-surface of the chamber peripheral wall 11 to the lower surface thereof.

The water-removing port 10 has an opening of which the size is such that a raw material cannot pass through the opening but water can pass through the opening. In the case in which the water-removing port 10 has a large opening, a screen 12 may be provided for the opening, and thus, the water-removing port 10 is obtained.

Figure 4:
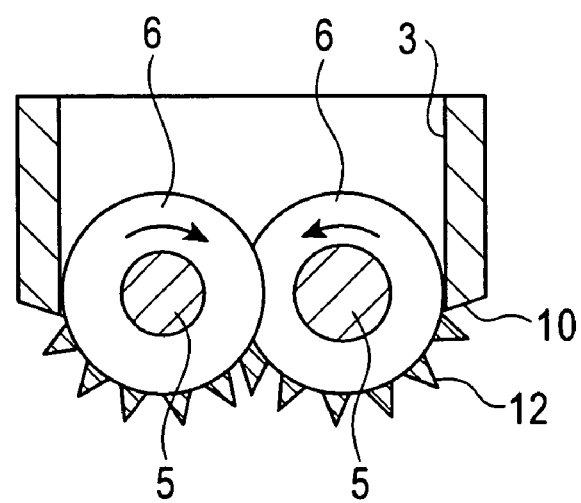
FIG. 4 is a cross-sectional view taken along lines IV-IV in FIGS. 1 and 2.

As shown in FIG. 4, as the screen 12, preferably, a wedge wire screen which provides a gap substantially in parallel to the rotor shafts 5. The screen 12 may be a punching plate which is a porous plate. However, the screen 12 is not restricted to the screen or plate.

Preferably, that the voids or the pore size is large from the viewpoint of the removal of a large amount of water. However, it is desirable that the size of the voids or the pore size is in the range of 0.1 to 3.0 mm to prevent a raw material from leaking.

The above-described structure of the conical twin-screw extruder according to the present invention is sufficient for the main structure thereof. Moreover, according to this embodiment, one of the rotor shafts 5 is more extended in the axial direction compared to the other rotor shaft 5, on the discharge port 4 side. This extension portion 13 functions as a single-shaft metering portion 14 for determining the amount of a raw material and extruding the raw material therefrom. The rotor shaft 5 having the metering portion 14 is longer than the other rotor shaft 5, that is, the length is 1.05 to 2.0 times of that of the other rotor shaft 5.

The metering portion 14 contains a spiral flight 15 and a cylindrical metering portion barrel 16. The spiral flight 15 is formed in the extension portion 13 of the rotor shaft 5 and having a constant diameter and a constant pitch. The cylindrical metering portion barrel 16 surrounds the flight 15. The metering portion barrel 16 is connected to the raw material discharge port 4 of the extruder-body barrel 2.

According to the conical twin-screw extruder having the above-described structure, a water-containing raw material is supplied through the raw material supply port 3. The supplied raw material is nipped between the flights 6 in the meshed state, due to the rotation of the two rotor shafts 5 in the different directions, and is conveyed toward the discharge port 4 side. In the case of a raw material containing a large amount of water such as a raw material conveyed by use of water, the water is removed through the water-removing port 10 located near the raw material supply port 3. The raw material containing water conveyed due the rotation of the rotor shafts 5 is strongly compressed because of the conical forms of the rotor shafts 5, so that water is separated. The separated water is caused to flow in the backward direction and removed through the water-removing port 10. The dehydrated raw material is supplied through the discharge port 4 into the metering portion 14. The metering portion 14 is filled with the raw material, since the conveying capacity of the flight 15 is smaller than that of the flights 6. Then, the raw material is supplied to the succeeding process at a constant amount-rate.

Figure 5:
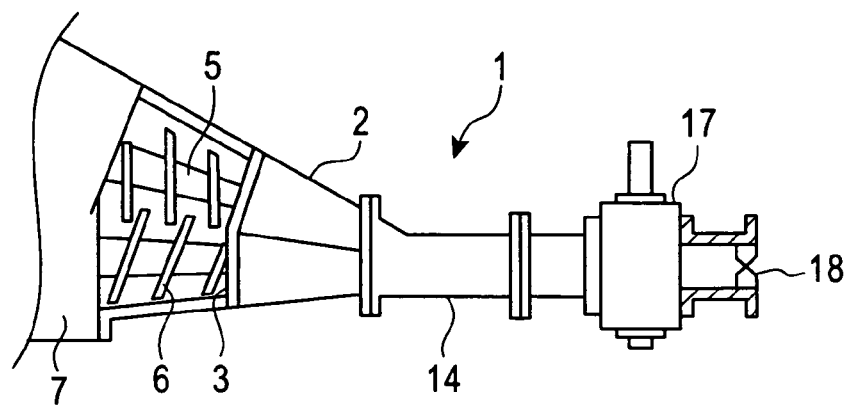
FIG. 5 is a partial cross-sectional plan view showing another embodiment of a conical twin-screw extruder of the present invention.

FIG. 5 shows another embodiment of the present invention. A gear pump 17 is connected to the outlet of the metering portion 14. A throttling portion 18 is provided at the outlet of the gear pump 17. The throttling portion 18 is made up of an orifice plate, and so forth. The throttling portion 18 is required to render a resistance to the flow of a raw material. The throttling portion 18 has such a structure that the cross section of the tube thereof can be changed.

The hydration efficiency can be enhanced by increasing the inner pressure in the vicinity of the discharge port 4 of the conical twin-screw extruder by means of the gear pump 17. Moreover, the accuracy of the supply to the succeeding process can be enhanced by metering the raw material with the gear pump 17.

The hydration efficiency can be also enhanced due to a resistance rendered by the throttling portion 18. The throttling portion 18 may be provided upstream of the gear pump 17. The throttling portion 18 and the gear pump 17 may be independently provided. In the case of the conical twin-screw extruder not provided with the metering portion 14, the throttling portion 18 and the gear pump 17 may be connected to the raw material discharge port 4.

Figure 6:
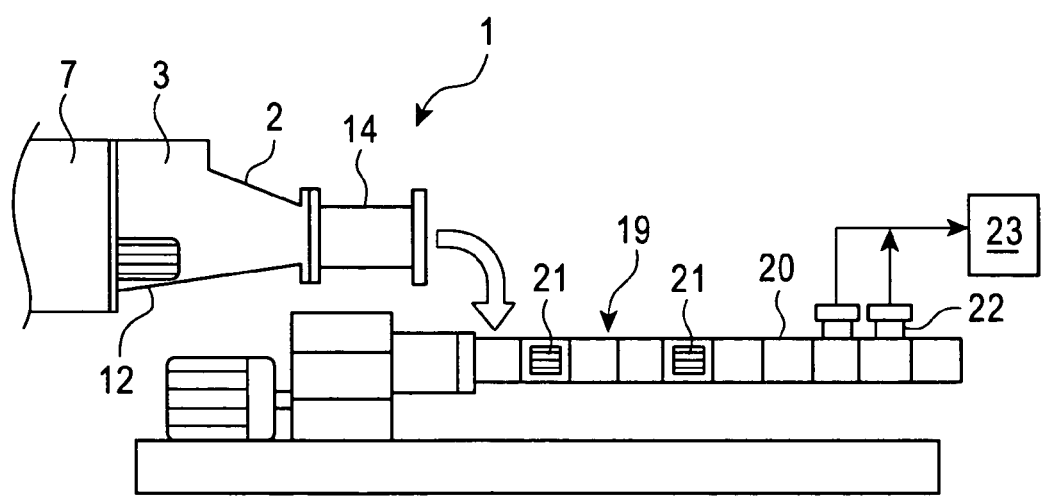
FIG. 6 illustrates the structure of a dehydrating apparatus according to the present invention.

FIG. 6 shows a tandem type dehydrator in which the conical twin-screw extruder is connected to a parallel twin-screw extruder 19 through a connecting piece (not shown).

The parallel twin-screw extruder 19 contains a heater (not shown) for heating an extruder barrel 20, a dehydrating screen 21 provided for the extruder barrel 20, and a vent 22 for removing steam. A pressure-reducing and deaerating device 23 is connected to the vent 22.

Both of the dehydrating screen 21 and the steam removing vent 22 are not necessarily provided. That is, either one of them may be provided.

With the dehydrating apparatus having the above-described constitution, a raw material with a high water content can be continuously dehydrated and deaerated to produce pellets as a product.

The present invention is not limited to the above-described embodiments.

The present invention can be used in apparatuses for manufacturing thermoplastic elastomers, rubbers, and resins.

What is claimed is:

1. A conical twin-screw extruder comprising:
   a barrel;
   a raw material supply port provided on one side of said barrel;
   a raw material discharge port on the other side of said barrel;
   two rotor shafts having flights on the outer peripheral surfaces thereof and being adjacent to each other in the lateral direction, said rotor shafts being accommodated in said barrel, wherein the distance between the shafts of said rotor shafts and the outside diameters of said flights thereof are gradually reduced from said supply port side to said discharge port side; and
   a water-removing port for removing water contained in a raw material supplied through said raw material supply port out of said barrel,
   wherein one of said rotor shafts extends beyond the other of said rotor shafts in the axial direction on the discharge port side.

2. The conical twin-screw extruder according to claim 1, wherein the axial lines of said two rotor shafts form an angle of 10 to 40 degrees.

3. The conical twin-screw extruder according to claim 1, wherein said flights of one of said rotor shafts and said flights of the other of said rotor shafts are in the meshed state, and said two rotor shafts can be rotated in different directions.

4. The conical twin-screw extruder according to claim 1, wherein said barrel has a chamber peripheral wall surrounding said flights, said chamber peripheral wall is formed in such a manner that the cross-section has substantially a shape consisting of two circles which have the same diameter and overlap with each other, the size of the cross-section is gradually decreased from said raw material supply port to said raw material discharge port, and the chamber peripheral wall is provided with said water-removing port.

5. The conical twin-screw extruder according to claim 1, wherein a screen is provided for said water-removing port.

6. The conical twin-screw extruder according to claim 5, wherein said screen is a wedge wire screen having a predetermined clearance, or a punching plate.

7. The conical twin-screw extruder according to claim 1, wherein each of said flights is formed in such a manner that the maximum diameter is 1.5 to 5.0 times of the minimum diameter.

8. The conical twin-screw extruder according to claim 1, wherein the extended portion functions as a single-shaft metering portion from which a raw material is extruded out at a constant amount-rate.

9. The conical twin-screw extruder according to claim 1, further comprising at least one of a gear pump and a throttling portion connected on said raw material discharge port.

10. A dehydrating apparatus comprising:
    the conical twin-screw extruder defined according to claim 1; and
    a parallel twin-screw extruder connected to the conical twin-screw extruder and positioned downstream of the conical twin-screw extruder.

11. The dehydrating apparatus according to claim 10, wherein said parallel twin-shaft extruder contains a heater for heating the extruder barrel, and at least one of a dehydrating screen and a vent for removing steam provided for the extruder barrel.

12. A dehydrating apparatus comprising:
    a conical twin-screw extruder comprising:
    a barrel,
    a raw material supply port provided on one side of said barrel,
    a raw material discharge port on the other side of said barrel,
    two rotor shafts having flights on the outer peripheral surfaces thereof and being adjacent to each other in the lateral direction, said rotor shafts being accommodated in said barrel, wherein the distance between the shafts of said rotor shafts and the outside diameters of said flights thereof are gradually reduced from said supply port side to said discharge port side, wherein one of said rotor shafts extends beyond the other of said rotor shafts in the axial direction on said discharge port side, and wherein the extended portion functions as a single-shaft metering portion from which a raw material is extruded out at a constant amount-rate, and
    a water-removing port for removing water contained in a raw material supplied through said raw material supply port out of said barrel; and
    a parallel twin-screw extruder connected to the conical twin-screw extruder and positioned downstream of the conical twin-screw extruder, wherein said parallel twin-shaft extruder contains a heater for heating the extruder barrel, and at least one of a dehydrating screen and a vent for removing steam provided for the extruder barrel.

13. The dehydrating apparatus according to claim 12, wherein the axial lines of said two rotor shafts form an angle of 10 to 40 degrees.

14. The dehydrating apparatus according to claim 12, wherein said flights of one of said rotor shafts and said flights of the other of said rotor shafts are in the meshed state, and said two rotor shafts can be rotated in different directions.

15. The dehydrating apparatus according to claim 12, wherein said barrel has a chamber peripheral wall surrounding said flights, said chamber peripheral wall is formed in such a manner that the cross-section has substantially a shape consisting of two circles which have the same diameter and overlap with each other, the size of the cross-section is gradually decreased from said raw material supply port to said raw material discharge port, and the chamber peripheral wall is provided with said water-removing port.

16. The dehydrating apparatus according to claim 12, wherein a screen is provided for said water-removing port.

17. The dehydrating apparatus according to claim 16, wherein said screen is a wedge wire screen having a predetermined clearance, or a punching plate.

18. The dehydrating apparatus according to claim 12, wherein each of said flights is formed in such a manner that the maximum diameter is 1.5 to 5.0 times of the minimum diameter.

19. The dehydrating apparatus according to claim 12, further comprising at least one of a gear pump and a throttling portion connected on said raw material discharge port.

* * * * *

UNITED STATES PATENT AND TRADEMARK OFFICE
CERTIFICATE OF CORRECTION

PATENT NO. : 7,322,738 B2  
APPLICATION NO. : 11/075710  
DATED : January 29, 2008  
INVENTOR(S) : Yasuaki Yamane et al.

It is certified that error appears in the above-identified patent and that said Letters Patent is hereby corrected as shown below:

On the title page, Item (73), the Assignee information is incorrect. Item (73) should read as follows:

-- Assignee: Kabushiki Kaisha Kobe Seiko Sho (Kobe Steel, Ltd.), Kobe-shi (JP) --

Signed and Sealed this

Third Day of June, 2008

JON W. DUDAS  
*Director of the United States Patent and Trademark Office*